Dec. 9, 1958 J. H. HERSHEY 2,864,043
MOTOR CONTROL FOR A RADAR RANGING UNIT
Filed Nov. 10, 1955 2 Sheets-Sheet 2

*INVENTOR.*
JOHN H. HERSHEY
BY
ATTYS.

United States Patent Office 2,864,043
Patented Dec. 9, 1958

2,864,043

MOTOR CONTROL FOR A RADAR RANGING UNIT

John Houck Hershey, Burlington, N. C., assignor, by mesne assignments, to the United States of America as represented by the Secretary of the Navy Application November 10, 1955, Serial No. 546,298

11 Claims. (Cl. 318—28)

This invention relates to gear units and more particularly to differential gear means with cam means for switching electrical circuits to control motive means to bring one input to the differential gear means into a corresponding relation with the other input over the shortest rotative path.

In the present invention a unit system has been devised to slew radar range inwardly or outwardly to new or different designated ranges from remote stations although the unit system may have many applications other than for radar ranging, radar ranging being used as one application to illustrate the invention. A drum having three annular cams thereon is driven from either end through a differential gear system to effect the actuation of microswitches by the cams to control a slewing motor driving a radar ranging unit. The slewing motor also drives the gear system in one end of the drum to actuate the switches when the proper range is reached. The range to be reached is established by manually controlling a designation unit in accordance with the range established by well known ranging devices and available to the operator of the designation unit. The designation unit is coupled to drive the other gear system of the drum to present the drum for proper switching when the slew motor is operative. The drum and the gear system inputs at each end thereof provide a differential so that the drum rotates in response to either input. The slew motor has an electric brake on the output shaft thereof in circuit with the electrical circuit of the slew motor to immediately brake or stop shaft rotation upon the interruption of slew motor energization to prevent overtravel of the drum. Switching is also provided to manually control the slewing of the radar range unit. It is therefore a general object of this invention to provide a differential means controlling an electrical switching arrangement to a power means coupled as one input to the differential means to operate in accordance with input information on the other input of the differential means to rotate the one input over the shortest rotative path to the coincidence of the input information.

Figure 1:
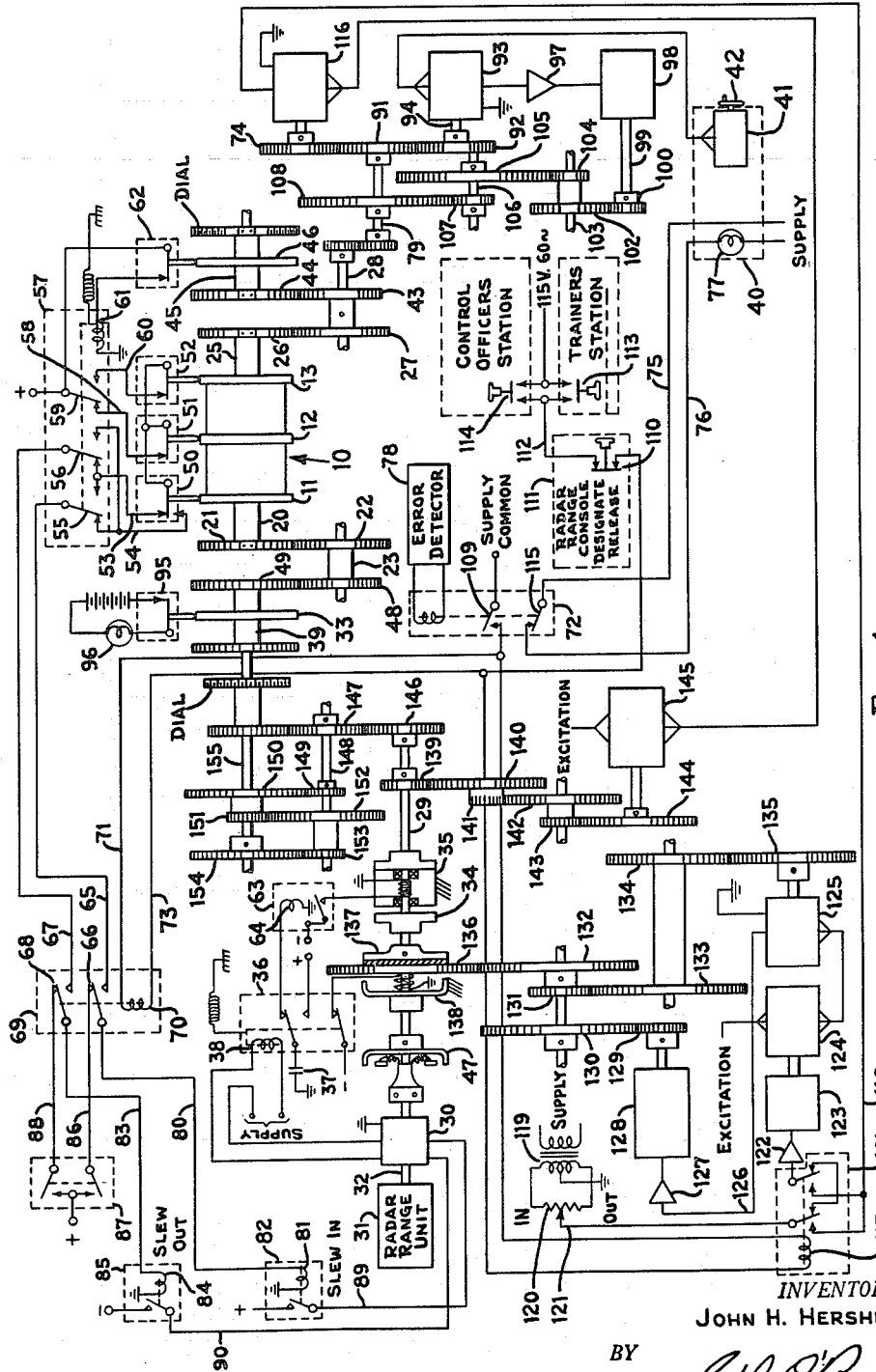
Figure 5:
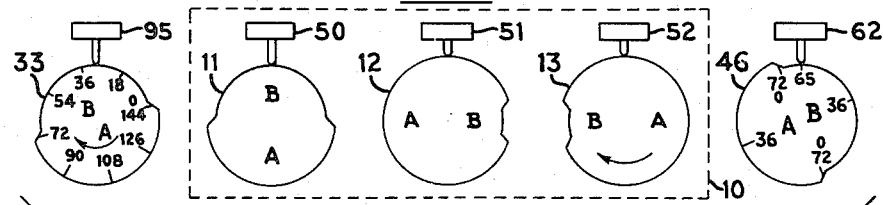
Figure 6:
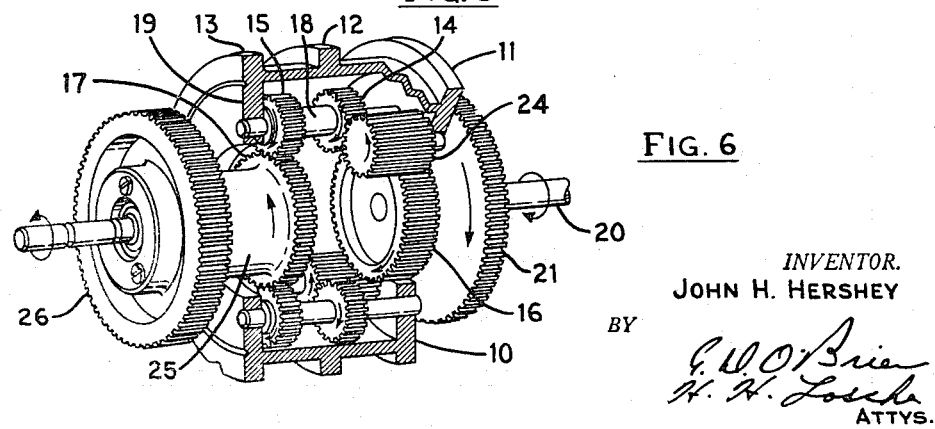

These and other objects, advantages, features, and uses will become more apparent as the description proceeds when taken in consideration with the accompanying drawings, in which:

Fig. 1 is a schematic view with some parts shown in block diagram of the combination and environment of this invention;

Figs. 2, 3, 4, and 5 are each diagrammatic representations of cam positions in respectively four different conditions of differential drum inputs; and Fig. 6 is a partly sectioned perspective rear view of the differential gear unit.

Referring more particularly to Fig. 1 and Fig. 6, there is illustrated a differential drum assembly including a drum 10 having three annular cam rings 11, 12, and 13 secured thereon, the cam configuration and function which will be described more fully with reference to Figs. 2 to 5. Planetary gears 15 and idler gears 24 are spaced in mesh around sun gears 16 and 17, respectively, in opposite ends of the drum 10, the number of gears 15 and 24 being in equal number of pairs, three pair or four pair, as is well known in the art. One each planetary gear 14 paired with one each planetary gear 15 is mounted on a shaft 18 rotatively supported in webs 19 of the drum 10. The idler gears 24 are supported on webs 19 and are in mesh with the planetary gears 14 and sun gear 16. The sun gear 16 is fixed to a shaft 20 to which is also fixed a spur gear 21 meshing with a spur gear 22 fixed on a shaft 23. Also fixed to shaft 23 is spur gear 48 in mesh with spur gear 49 on shaft 39. The ratio of the spur gears 22 to 21 is 1 to 1. The ratio of spur gears 49 to 48 is 2 to 1. The left end, as viewed in Fig. 6, of the drum 10 has the sun gear 17 fixed on a shaft 25 on which is also fixed a spur gear 26. Referring to Fig. 1, the spur gear 26 meshes with a spur gear 27 on a shaft 28 in a 1 to 1 ratio.

The shaft 29 is driven by a motor, herein referred to as a slew motor 30 for illustrating the invention, which motor also drives a radar ranging unit 31 through shaft 32. Shaft 29 is driven by the slew motor through the centrifugal clutch 47. The purpose of driving the ranging unit 31 will become clearer as the description proceeds. On the shaft 39 is a cam wheel 33. On shaft 29 is a magnetic brake which is clampable by a brake disc 34. The brake disc 34 is operated by a solenoid coil 35 in circuit to a switch 63 switchable in the operated position to place the solenoid 35 in circuit with a voltage source or supply, as twenty-four volts, or the like. The switch 63 is actuable by solenoid coil 64 in circuit to switch 36 switchable in the normal position to a condenser 37. The switch is actuable by the solenoid 38 connected to the supply circuit to the slew motor 30 to connect the condenser 37 to a voltage source in the energized condition of the slew motor. Whenever the slew motor 30 control circuit is interrupted, the solenoid 38 is deenergized to return the switch 36 to normal position in which the charged condenser 37 is in circuit with the switch solenoid 64 operating switch 63 momentarily thereby applying the brake momentarily to stop shaft 29 rotation with very little overtravel.

Coincident with the charging of condenser 37 the switch 36 closes a circuit from a voltage source such as twenty-four volts, or the like, to the solenoid 138 which overcomes the spring tension coupling gear 136 to shaft 29 through friction contact with coupling 137. Action of solenoid 138 causes gear train associated with gear 136 to be removed from the slewing operation. With the completion of the slewing operation, solenoid 138 is deenergized returning the friction couple between 136 and 137 to normal.

The shaft 28 is coupled to shaft 79 on which is mounted gear 91. Gear 91 is in mesh with gear 92 mounted on the shaft of a synchro control transformer 93. The control transformer 93 is connected by three electrical conductors properly phased to a range designation transmitter, referred to generally by the reference character 40, the range designation transmitter 41 controllable by a handwheel 42 which handwheel may have a dial indicator (not shown) for yards per revolution calibrations. Also fixed on the shaft 28 is a spur gear 43 that meshes with a spur gear wheel 44. The spur gear wheel 44 is on a shaft 45 on which is fixed a cam wheel 46. The ratio of the spur gear 43 to the spur gear wheel 44 is 1 to 2. The shaft 28 rotational position is clamped by the servo loop consisting of control transformer 93, amplifier 97, motor 98, shaft 99, gears 100, 102, shaft 103, gears 104, 105, shaft 106, gears 107, 108, shaft 79, gears 91, 92, and shaft 94 of the control transformer 93, and the shaft 23 is restrained by a similar servo loop in the radar range unit to allow either shaft to impart rotation to the drum 10 without affecting the rotative position of the other shaft. The drum 10 being geared to sun gears 16 and 17 through the idler gear 24 and planetary gears 14 and 15 can only rotate to indicate the difference of position of input shafts 20 and 25.

While the differential system may have many applications in which the shafts 39 and 28 would be related in their rotative angles to instrumentalities, it is herein illustrated as being associated with a ranging system wherein it is more expedient to relate shaft and drum rotation with yards of distance per revolution. For example, let it be assumed for the purpose of illustrating the invention herein that the shaft 39 represents 144,000 yards for each revolution and that shaft 28 represents 72,000 yards for each revolution. From Fig. 1 it may be seen that one revolution of shaft 39 will produce two revolutions of shaft 20. By reason of the planetary gears 14 cooperating with the idler gear 24 to the sun gear 16 one revolution of shaft 20 will produce one-half revolution of the drum 10, the drum 10 revolving in the same rotative direction to that of shaft 20 by reason of the planetary gear 15 walking around the sun gear 17. The same is true for the drum 10 rotation when the rotative input is in shaft 25. The ratio of shafts 39 to 20 being 1 to 2 and the ratio of shaft 20 to drum 10 being 2 to 1 makes shaft 39 to drum 10 a 1 to 1 ratio whereupon the cam wheel 33 will rotate in the same rotative direction and at the same speed as the drum 10. The input on the shaft 39 may be referred to generally, and for convenience, as the slew motor input. It may also be seen from Fig. 1 that the shaft 28, which may be referred to generally as the range designator input, rotates in a 1 to 1 ratio with the shaft 25 and in a 2 to 1 ratio with the shaft 45. The drum 10, then, will rotate in the opposite rotative direction as the shaft 28 but at half the angle which produces a ratio of 1 to 1 between the drum 10 and the shaft 45 but in the same rotative direction. It is therefore understood that the drum 10 and the cam wheel 46 will rotate in equal angles and in same directions when shaft 28 is rotated and the sun gear 16 is stationary. Shaft 28 rotation is produced indirectly by operation of the handwheel 42.

Referring again to Fig. 1, the annular cams 11, 12, and 13 actuate micro-switches 50, 51, and 52, respectively, the micro-switch 50 having alternate contacts connected to conductors 53 and 54. The switch blades of all three switches 50, 51, and 52 are coupled in common. The conductor 54 is connected to the left contact of a double throw switch 55 and the right contact of a double throw switch 56, the switches 55 and 56 being in a relay switch unit 57. The conductor 53 is connected to the right contact of relay switch 55 and the left contact of relay switch 56. A conductor 58 connects the single contact in the micro-switch 51 to the left contact of a double relay switch 59 in the relay unit 57. Conductor 60 connects the single contact in the micro-switch 52 with the right contact of the relay switch 59. The relay switch unit 57 is under the control of an electro-magnetic operator 61 in circuit through a micro-switch 62 actuated by the cam wheel 46, hereinafter referred to as the sector transfer cam. The annular cam 11 will hereinafter be referred to as the slew sense cam; the annular cam 12 will hereinafter be referred to as the sector 12 cam; and the annular cam 13 will hereinafter be referred to as the sector 13 cam. The switch blades of the relay switch 59 and the micro-switch 62 are coupled in common to a voltage source or supply, as twenty-four volts, or the like.

The switch blade of relay switch 55 is connected by conductor 65 to the lower contact of a double throw relay switch 66. The switch blade of relay switch 56 is connected by conductor 67 to the lower contact of a double throw relay switch 68, the relay switches 66 and 68 being in a slew transfer relay unit 69. The transfer relay unit 69 is actuated by an electro-magnet 70 having one lead 71 connected to the upper contact of a double pole lockout relay 72, the switch blade 109 of which is connected to a source of voltage supply, as 115 volt 60 cycle common, or the like. The other lead 73 of the electro-magnet 70 is connected to one contact of a normally closed manual contactor 110 in the radar range console 111. The other contact of contactor 110 is connected by conductor 112 to one contact each of normally open contactors 113 and 114 at the trainer and control officer location in a gun director. The other contact of contactors 113 and 114 are in multiple and connected to a source of voltage, 115 volt 60 cycle, or the like. The lower contact of the lockout relay switch 72 is connected by conductor 76 to the automatic radar signaling device 77 in the range designator unit 40, the other lead of the device 77 being connected with a source of voltage, 115 volt 60 cycle, or the like. The lockout relay 72 electro-magnet actuator is coupled to an error detector 78 to switch the switch blades of the relay 72 disconnecting the voltage source from the electro-magnet actuator 70 and connecting the voltage source at the designating unit 40 through lead 75 to switch blade 115, lower terminal of relay 72, lead 76 to indicator 77, the other lead of 77 being connected as described above.

The switch blade of the relay switch 66 is connected by conductor 80 through an electro-magnet actuator 81 in a slew-in relay switch 82, and the switch blade of the relay switch 68 is connected by conductor 83 through an electro-magnet actuator 84 in a slew-out relay switch 85. The upper contact of relay switch 66 is connected by conductor 86 to the switch blade of a single pole-double-throw switch 87, and the upper contact of relay switch 68 is connected by conductor 88 to the other switch blade of the switch 87. The single contact of the switch 87 is coupled to a voltage source, as is understood in the art. The switch blades of the slew relay switches 82 and 85 are connected by conductors 89 and 90 to the slew motor 30 directional sensing circuit, each conductor being isolated from the other. The single contact of each slew relay 82 and 85 is coupled to a voltage source, the voltage source of one being of opposite polarity to that of the other to provide the correct rotative direction to the slew motor for either slew relay operation.

The cam wheel 33, hereinafter generally referred to as the add cam, controls a micro-switch 95 which is switchable in a circuit through a voltage source and a panel light 96. In practice the panel light 96 would be in a panel near the operator of the radar range unit indicators. The add cam 33 has a high cam sector and a low cam sector, the contour of which is more clearly shown in Figs. 2 to 5, to provide panel lamp 96 extinguishment in the yard range from zero to 72,000 and to provide panel lamp 96 glow in the yard range from 72,000 to 144,000 so that operating personnel will know that the radar ranging unit is slewed in within the range of the designator unit 40 or outside this range.

In the operation of the system, Fig. 1 will be referred to with occasional reference to one of Figs. 2 to 5. Figs. 2 to 5 show four different cam positions for certain differential drum inputs providing four different examples. The cam position examples are shown one under the other, the specific cams referred to being under the legends at the top of the drawing. For the purpose of clarity each high cam portion will be referred to as sector A and the low cam portion will be referred to as sector B. The several micro-switches will each have the actuator pin biased outwardly against the cam surface as is well understood in the art. For clarity, let it also be assumed that all the cams are seen as viewed from the left end of Fig. 1, looking to the right.

Figure 2:
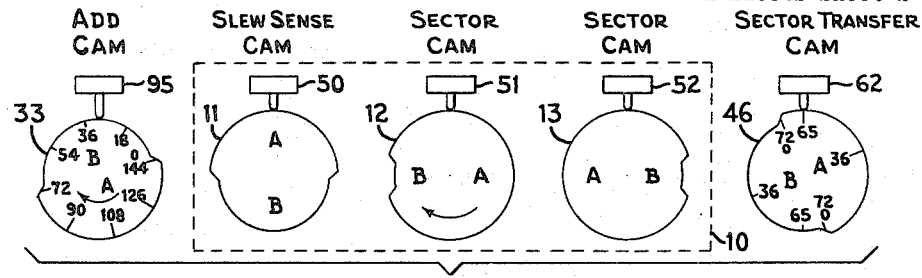

For the purpose of example let it be assumed that drum 10 is resting so that the cams 11, 12, and 13 are positioned as seen in Fig. 2. The add cam 33 is resting at a range of 29,000 yards, the indicia being placed thereon purely for the purpose of example herein. The operator has set the handwheel 42 to set the sector transfer cam 46 at 65,000 yards, the indicia being thereon purely for convenience of the example. It is believed helpful, without proceeding with the example, to understand that the operator could rotate handwheel 42 to rotate the sector transfer cam to 29,000 yards on either cam sector A or B which would rotate sector cams 12 and 13 so that in either case micro-switch 51 or 52 would be opened preventing the slew motor from operating, as will later become clear. With either contactor 113 or 114 closed for operation and the cams in the positions of Fig. 2, the micro-switch 62 is closed energizing the electro-magnet actuator 61 of the relay unit 57 throwing all the switch blades to the left as shown in Fig. 1. The closing of either contactor 113 and 114 will energize the relay 69 to pull the switch blades down disabling the switch 87. The relay switch 59 selects the sector 12 cam and the micro-switch 50 is actuated by the A cam sector to hold the switch blade up as shown in Fig. 1. A circuit is therefore set up from the voltage source through relay switch 59, conductor 58, micro-switch 51, micro-switch 50, conductor 53, relay switch 56, conductor 67, relay switch 68, conductor 83, and electro-magnet actuator 84 of relay switch 85 to complete the circuit through ground. This places the voltage source on the slew motor 30 through conductor 90 to cause rotation of the slew motor in the clockwise direction (see Fig. 2, arrow direction) which rotation will continue until the B sector of the sector 12 cam allows the actuator pin of the micro-switch 51 to drop therein opening the circuit to the relay switch 85 which in turn cuts the directional control circuit to the slew motor. When the slew motor 30 was running the relay switch 36 was operated placing the condenser 37 in circuit with the voltage source. Upon the interruption of the circuit through the relay switch 85 the relay switch 36 was deenergized placing the charged capacitor 37 in circuit with the solenoid coil 64 operating relay 63, thereby energizing the brake 34 to brake the rotation of shaft 29. The slew motor 30 operation will cause rotation of the add cam 33 to a point reading at 65 (meaning 65,000 yards) under the micro-switch 95 actuating pin which brings the left input of the differential drum unit 10 into correspondence with the right input of this drum. The slew motor operation causes the radar range unit to slew out to a range of approximately 65,000 yards which is very close to the range desired as indicated by the setting of the range designator 40.

Since the selector cams function at a rate of 144,000 yards per revolution and the slewing speed is in excess of 10,000 yards per second, a secondary control is required to eliminate precise mechanical alignment and adjustment of the cam operated switches and the magnetic brake. This secondary control is effective immediately following the slewing action just described. Synchro control transformer 116 is electrically positioned in agreement with synchro control transformer 93 and thereby repeats the electrical position of the designated range provided by the handwheel 42 of the range designation controller 41. Synchro geneator 145 in the range gear unit generates range on an electrical position basis and is positioned to reflect the radar range of the Radar Range Unit 31. The output of the synchro generator 145 indicating radar range is connected to the synchro control transformer 116 indicating designated range. The synchro control transformer 116 functions to provide an output signal proportional to the position differences of the shafts of 145 and 116. When as a result of the slewing action the radar range and the designated range are not in exact agreement the error signal generated by the synchro control transformer 116 is connected to the left hand contacts of relay switch 101 over lead 118. Relay switch 101 is connected in multiple with relay switch 69 and operates simultaneously. Operation of relay switch 69 has been described. With relay switch 101 operated by action of solenoid 117 the two armatures are connected to lead 118 thereby completing a circuit to amplifier 122. Amplifier 122, synchro motor 123, and synchro differential generator 124 make up a follow-up unit having other functions associated with the range unit. For this explanation the error signal applied to amplifier 122 is amplified by it and is applied to motor 123 causing it to rotate in a direction dependent upon the phase of the applied signal. Rotation of motor 123 is transmitted to the rotor of a differential synchro generator 124. The rotation of the rotor of 124 modifies the excitation applied to it resulting in an output which is positioned electrically to indicate the difference between the electrical position of its excitation and the physical position of its rotor. This positioned output is in turn applied to the input of a synchro control transformer 125 and its output is modified by the position of its rotor. Any difference in position between the electrical input and the shaft position of 125 results in an error signal which is connected to amplifier 127. The amplified output from amplifier 127 is applied to a synchro motor 128 causing gear 129 to be rotated in a direction to reduce the difference between radar range and designated range. This correction is obtained by gear 129 driving gear 130 which in turn transmits rotation through gear 132 to gear 136 coupled to the range shaft 29 through the magnetic clutch friction face 137. Shaft 29 is coupled to the synchro generator 145 through gears 139, 140, 141, 142, 143, and 144 causing the shaft of the synchro generator 145 to rotate. The direction of rotation is such as to reduce the positional difference between synchro generator 145 representing radar range and the synchro control transformer 116 representing designated range thereby reducing the error voltage output from 116. Motor 128 continues to drive until the error output from 116 is essentially zero and in doing so brings radar range in close agreement with designated range. If the operator controlling the designation handwheel 42 is correcting the designation from radar search data the correction increments on a search sweep to sweep basis would in general be much less than the change in range required to actuate the slewing function, however, the secondary control feature just described will maintain the radar range unit at the designated range. A tertiary control is provided to assist the radar range operator in acquiring the designated target. Since designation is based upon previous position of a target, arrangements are provided to shift radar range either side of the designated by use of the radar slow slew control 120. A source of supply is connected through transformer 119 to the slow slew control 120. This control when not associated with the designation system is used as a rate generator for siding tracking purposes. When connected as indicated the output from 120 is connected over lead 121 to one armature of relay switch 101. This relay is operated under the designate condition and the circuit 121 from the slow slew control 120 is connected to the secondary control lead 118 through the two armatures and left hand contacts of relay switch 101. The slow slew control is a spring loaded zero centered control. When the designated target as observed on the range indicator is at a range other than that which will permit gating for automatic tracking purposes the range operator can modify the range of the range units by operating the slow slew control 120 in either the IN or OUT direction as required. This introduces an error into amplifier 122 resulting in rotation of the motor 128 as previously described. Rotation continues until the error voltage from the synchro control transformer 116 is equal and of opposite phase to the voltage supplied by 129. This means that the displacement of control 120 results in a displacement of range of the radar range unit thereby allowing the operator to compensate for the time lag of the designation system.

Figure 3:
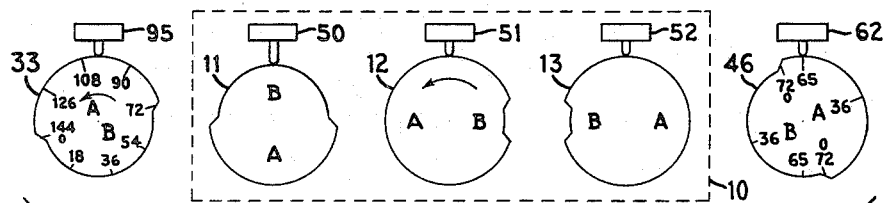
Figure 4:
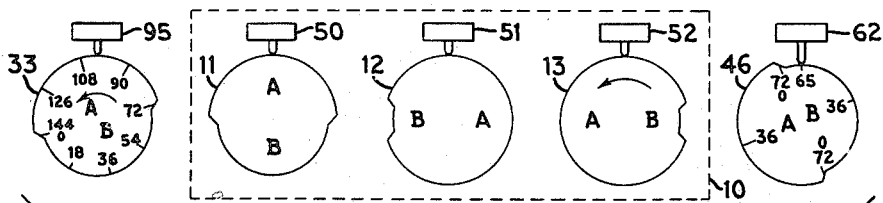

In the second example as illustrated in Fig. 3 the radar range unit 31 is resting at a range of 101,000 yards while the range designator is controlled to 65,000 yards. Here the panel light 96 is lighted since the A section of the add cam causes the micro-switch 95 to be closed. The slew sense cam has the B section thereof in contact with the micro-switch 50 lowering the switch blade to the lower contact position. The sector transfer cam 46 is in the same position as for the first example in which the relay unit 57 remains as shown in Fig. 1. The circuit through relay switch 59 is via 58, 51, 50, 54, 55, 65, 66, 80 and 81 establishing a rotative control voltage to the slew motor by conductor 89 causing rotation thereof in the counter-clockwise direction (see Fig. 3). This drives add cam 33 in the direction shown by the arrow to rest at 65,000 yards at which time micro-switch 51 is again opened to break the circuit. As the add cam 33 rotates the indicia 72 past the micro-switch 95, the panel light 96 will be extinguished. Here again the radar range unit 31 will be slewed to correspond approximately to the range designator setting 40, this time being slewed in from a greater range. The final positioning of radar range is accomplished in the same manner as described in the first example.

In the third example illustrated in Fig. 4, the add cam 33 is again resting as in the second example wherein the radar range unit is set at 101,000 yards. The micro-switch 95 is switched upwardly as shown in Fig. 1 by add cam 33, section A. The B section of sector transfer cam 46 is in engagement with the micro-switch 62 opening the circuit to the relay unit 57. The sector 13 cam is therefore selected and a voltage is applied via 59, 60, 52, 50, 53, 55, 65, 66, 80, and 81 to energize relay switch 82. The directional control voltage is applied over conductor 89 to the slew motor 30 causing rotation in the counter-clockwise direction until the micro-switch 52 actuator drops into the B section of the sector cam 13 at which time the circuit to the relay switch 82 is broken. This causes a slewing in of the radar range unit 31 from 101,000 yards to 65,000 yards to correspond approximately to the range designator setting. Final position of the range unit is obtained in the same manner as described in the first example.

In the fourth example illustrated in Fig. 5 the add cam 33 is in the same position as it was in the first example indicating that the radar ranging unit is at 29,000 yards. The sector transfer cam 46 is in the same position as it was in the third example and the slew sense cam 11 is in the same position as it was in the second example. The voltage to the relay switch 85 is through the micro-switch 52 under the control of the sector cam 13 to cause the radar range unit to slew out from 29,000 yards to 65,000 yards. In the first and fourth examples the panel light 96 will be out indicating that the instruments are reading within the 72,000 yard range. In the second and third examples the panel light is an indication to operating personnel that 72,000 yards should be added to the initial dial readings, before automatic range designation is accomplished.

Whenever it is desirable to control the slew other than by the range designator unit 40 the, contactor 110 may be opened and the switch 87 controlled to selectively slew the radar range unit. The error detector 78 will interrupt the circuit to the relay switch 69 in every instance that the associated radar system is automatically tracking a target.

While the preferred form of the invention is illustrated and described herein using an example of a specific use, it is to be understood that many modifications and changes may be made in the constructional details and features to adapt the device for different uses without departing from the spirit and scope of the invention and I desire to be limited only in the scope of the appended claims.

I claim:

1. A differential circuit switching comparative follow-up device comprising, a rotatable drum, a plurality of sector cams supported coaxially on said drum for rotation therewith, a pair of shafts, differential means for rotating said drum from either of said pair of shafts, reversible motive means for reversibly driving one of said shafts, switches actuated by said sector cams, and directional control circuits to said reversible motive means controlled by said switches, said sector cams being shaped and arranged to actuate said switches to cause the reversible motive means to drive said one shaft over the shortest angular rotative direction to bring said one shaft into an angular position corresponding to the angular position of the other shaft.

2. A differential circuit switching comparative follow-up device comprising; a drum, a plurality of sector cams fixed to said drum in coaxial relation; one shaft driven by a reversible motive means coupled to drive said drum supported sector cams through a differential means; a second rotatively positionable shaft coupled to drive said drum supported sector cams in either rotative direction through a differential means; a directional control circuit for said motive means; and switches actuatable by said sector cams and in serial coupled relation in said directional control circuit, one of said switches being actuatable to control the rotational direction of said motive means and another of said switches being actuatable to interrupt said directional control circuit whereby said motive means will cause rotation of said one shaft to bring said one shaft into a corresponding angular relation of said second rotatively positionable shaft.

3. A differential circuit switching comparative follow-up device comprising; a plurality of drum supported sector cams; one shaft driven by a reversible motive means coupled to reversibly drive said drum supported sector cams through a differential means; a second rotatively positionable shaft coupled to drive said drum supported sector cams in either rotative direction through a differential means, said second shaft having a sector cam thereon; electrical switches, one each actuatable by one each sector cam, one of said drum supported sector cams and the second shaft supported sector cam having like cam contours; a control circuit for said motive means under the control of said switches actuatable by said drum supported sector cams, said switch actuatable by said one of said drum supported sector cams being operative to reverse the control circuit to cause reversal of said motive means; a reversing switch in said control circuit between said last mentioned switch and said motive means; and a circuit operative to throw said reversing switch in circuit through said switch actuatable by said sector cam on said second shaft whereby the switches controlled by said sector cams on said drum and on said second shaft control the directional rotation of said one shaft over the shortest rotative direction and the other switches actuatable by the drum supported sector cams interrupt the control circuit to said motive means when said one shaft comes to a rotational position corresponding to the rotational position of said second shaft.

4. A differential circuit as set forth in claim 3 wherein said reversing switch in said control circuit switches said control circuit to place said control circuit through only one of said other switches actuatable by said drum supported sector cams.

5. A differential circuit as set forth in claim 4 wherein said other switches actuatable by said drum supported sector cams are single-pole-single-throw switches and said switch actuatable by said one of said drum supported sector cams is a single-pole-single-throw switch in which the single pole thereof is connected electrically with the single pole of all the other single-pole-single-throw switches.

6. A differential circuit switching comparative follow-up device comprising, a rotatable drum, a plurality of sector cams supported coaxially on said drum for rotation therewith, a pair of shafts, differential means for rotating said drum from either of said shafts, reversible motion means for reversibly driving one of said shafts, a brake on said one of said shafts coupled to said motive means to be operative momentarily upon the cessation of operation of said motive means, switches actuated by said sector cams, and directional control circuits to said reversible motive means controlled by said switches, said sector cams being constructed and arranged to cause actuation of the switches to control said motive means to drive the shaft driven thereby through the shortest angle to an angular position corresonding to the angular position of the other shaft.

7. A differential circuit switching comparative follow-up comprising; a drum supporting a direction sense cam and sector cams annularly therealong; a driven shaft driven by a reversible motive means and coupled through differential gear means to said drum; a rotatively positionable shaft coupled through a differential gear means to said drum; a brake on said driven shaft associated with said motive means to momentarily brake said driven shaft upon deenergization of said motive means; a direction transfer cam on said rotatively positionable shaft; electrical switches, one each actuatable by one each cam, said switch actuatable by said direction sense cam being reversible; a relay switch means having a reversing switch and a selector switch therein; a circuit controlling said relay in circuit with the switch actuatable by said direction transfer cam; and a motive means control circuit coupled through said relay selector switch, said electrical switches actuatable by said drum sector cams, said reversing switch actuatable by said direction sense cam, and said relay reversing switch whereby the motive means will drive said drum over the shortest rotative path as determined by the reversing switch positions to be stopped in the rotative position corresponding to the rotative position of the rotatively positionable shaft as determined by the selected drum sector cam.

8. A differential circuit switching device as set forth in claim 7 wherein said brake is an electro-magnetic brake, the electro-magnet of which is coupled through a switch to a condenser, and said switch is controlled by said motive means to switch said condenser in circuit to a voltage source for charging thereof when said motive means is in operation and to return said switch coupling said charged condenser to said electro-magnetic brake when said motive means is inoperative.

9. A differential circuit switching device as set forth in claim 7 wherein said motive means control circuit controls a pair of relays adaptable to switch either of two potentials of opposite polarity to said motive means thereby controlling the direction of rotation of said motive means.

10. A differential circuit switching device as set forth in claim 9 wherein said reversing switch actuatable by said direction sense cam is a single-pole-double-throw switch and said electrical switches actuatable by said sector cams are single-pole-single-throw switches, the single pole of all being connected electrically in common.

11. A differential circuit switching comparative slew follow-up device comprising; a drum supporting a slew sense cam and two sector cams annularly therealong; a slew drive shaft driven by a reversible rotary motor, said shaft being mechanically coupled through a differential gear system to said drum to cause drum positioning in correspondence to angular positions of said slew drive shaft representative of range distance; a range designator shaft rotatable to angular positions representative of range distance, said designator shaft being mechanically coupled through said drum to cause drum positioning in correspondence to angular positions of said designator shaft; a supply voltage for said reversible rotary motor; an electro-magnetic brake on said slew drive shaft electrically associated with said supply voltage to energize said brake when said motor is inoperative; a transfer cam rotated by said designator shaft; electrical switches actuatable by said cams, the slew sense cam switch being single-pole-double-throw and the sector cam switches and transfer cam switch being single-pole-single-throw, the single pole of said slew sense cam switch and sector cam switches being connected in common; a relay unit actuatable by a circuit through said transfer cam switch, said relay unit having a reversing switch and a selector switch therein, the selector switch being adaptable to selectively switch a voltage source to either of said sector cam switches and the reversing switch being adaptable to reverse the voltage source for either throw position of said slew sense cam switch; and relay switch means controlled from the voltage source through said relay selector switch, said sector cam switches, said slew sense cam switch, and said relay reversing switch to control either of two potentials to said reversible rotary motor to produce either of the rotary directions thereof, the slew sense cam and the transfer cam being constructed and arranged to cause reversible rotary motor rotation in a rotative direction of least revolutions to bring said slew drive shaft into representative range correspondence with that of said range designator shaft, and said sector cams being constructed and arranged to cause interruption of said reversible rotary motor operation when said slew drive shaft and said designator shaft are in representative angular coincidence.

References Cited in the file of this patent

UNITED STATES PATENTS

| | | |
|---|---|---|
| 1,559,525 | Murphy et al. | Oct. 27, 1925 |
| 1,693,314 | Murphy | Nov. 27, 1928 |
| 2,444,813 | Cunningham | July 6, 1948 |
| 2,572,986 | Chance | Oct. 30, 1951 |
| 2,611,893 | McCoy | Sept. 23, 1952 |
| 2,644,156 | Schneider | June 30, 1953 |
| 2,703,401 | Rosa | Mar. 1, 1955 |